United States Patent
Toyoda et al.

(10) Patent No.: US 7,168,326 B2
(45) Date of Patent: Jan. 30, 2007

(54) COMPACT PRESSURE SENSOR WITH HIGH CORROSION RESISTANCE AND HIGH ACCURACY

(75) Inventors: Inao Toyoda, Anjo (JP); Hiroaki Tanaka, Kariya (JP); Ichiharu Kondo, Nagoya (JP); Makoto Totani, Kariya (JP)

(73) Assignee: Denso Corporation, Kariya (JP)

( * ) Notice: Subject to any disclaimer, the term of this patent is extended or adjusted under 35 U.S.C. 154(b) by 57 days.

(21) Appl. No.: 11/079,475

(22) Filed: Mar. 15, 2005

(65) Prior Publication Data

US 2005/0210993 A1 Sep. 29, 2005

(30) Foreign Application Priority Data

Mar. 17, 2004 (JP) ............................. 2004-077130
Mar. 17, 2004 (JP) ............................. 2004-077131

(51) Int. Cl.
*F02P 5/00* (2006.01)
(52) U.S. Cl. ......................................... 73/754; 73/756
(58) Field of Classification Search ................. 73/756, 73/754
See application file for complete search history.

(56) References Cited

U.S. PATENT DOCUMENTS

| | | | |
|---|---|---|---|
| 4,930,353 A * | 6/1990 | Kato et al. ..................... | 73/727 |
| 5,595,939 A | 1/1997 | Otake et al. | |
| 6,694,818 B1 * | 2/2004 | Chikuan et al. ............... | 73/715 |

| | | | |
|---|---|---|---|
| 2002/0062698 A1 | 5/2002 | Baba et al. | |
| 2004/0103724 A1 * | 6/2004 | Takizawa et al. ............. | 73/754 |
| 2004/0194550 A1 * | 10/2004 | Wakasugi et al. ............. | 73/754 |

FOREIGN PATENT DOCUMENTS

| | | |
|---|---|---|
| DE | 42 19 575 A1 | 7/1993 |
| DE | 197 20 123 A1 | 7/1998 |
| EP | 0 671 289 A1 | 9/1995 |
| JP | 02-148768 | 6/1990 |
| JP | 5-47559 | 2/1993 |
| JP | 7-209117 | 8/1995 |
| JP | 7-243926 | 9/1995 |
| JP | A-08-193899 | 7/1996 |
| JP | A-10-185724 | 7/1998 |

* cited by examiner

*Primary Examiner*—Edward Lefkowitz
*Assistant Examiner*—Andre Allen
(74) *Attorney, Agent, or Firm*—Posz Law Group, PLC (57) ABSTRACT

A pressure sensor mainly includes a sensor chip, a circuit chip, and a substrate. The sensor chip is configured to generate an electrical signal representative of a pressure being sensed and includes a sensing area and a plurality of contact pads. The circuit chip includes a circuit configured to process the electrical signal and a plurality of contact pads. The substrate includes a resin sheet having an opening and a plurality of conductors within the resin sheet. The substrate is joined to both the sensor chip and circuit chip so that the sensing area of the sensor chip is to be exposed to the pressure being sensed through the opening of the resin sheet, the contact pads of the sensor chip and circuit chip are electrically connected to the conductors of the substrate, and all the contact pads and conductors are hermetically embedded in the resin sheet of the substrate.

20 Claims, 10 Drawing Sheets

COMPACT PRESSURE SENSOR WITH HIGH CORROSION RESISTANCE AND HIGH ACCURACY

CROSS-REFERENCE TO RELATED APPLICATION

This application claims priority from Japanese Patent Applications No, 2004-77130, filed on Mar. 17, 2004, and No. 2004-77131, filed on Mar. 17, 2004, the contents of which are hereby incorporated by reference into this application.

BACKGROUND OF THE INVENTION

1. Technical Field of the Invention

The present invention relates generally to pressure sensors. More particularly, the invention relates to improved pressure sensors each of which has a compact size and high corrosion resistance and ensures high accuracy in sensing a pressure.

2. Description of the Related Art

Japanese Patent No. 3,198,779, an English equivalent of which is U.S. Pat. No. 5,595,939, discloses a pressure sensor that is configured to sense a pressure of a highly corrosive fluid.

According to the disclosure, the pressure sensor has a structure in which a sensing element is connected to connector pins by wire bonding, and all the sensing element, bonding wires, and connector pins are placed in an oil and sealed by means of a corrosive resistant metal diaphragm.

However, with such a structure, the pressure sensor necessarily includes the metal diaphragm, the oil, an O-ring for sealing, etc., thus resulting in great difficulty in making the pressure sensor compact.

SUMMARY OF THE INVENTION

The present invention has been made in view of the above-mentioned problem.

It is, therefore, a primary object of the present invention to provide pressure sensors each of which has a compact size and high corrosion resistance and ensures high accuracy in sensing a pressure.

According to a first aspect of the present invention, a pressure sensor is provided which includes:

a sensor chip configured to generate an electrical signal as a function of a pressure being sensed, the sensor chip having a surface that includes a sensing area and a plurality of electrical contact pads that are disposed on the surface of the sensor chip; and a substrate including a resin sheet that has an opening formed therethrough and a plurality of electrical conductors arranged within the resin sheet, the substrate being joined to the sensor chip so that the sensing area of the surface of the sensor chip is to be exposed to the pressure being sensed through the opening of the resin sheet of the substrate, the electrical contact pads of the sensor chip are electrically connected to the electrical conductors of the substrate, and all the electrical contact pads and electrical conductors are hermetically embedded in the resin sheet of the substrate.

With such a structure, when the pressure sensor is used in a corrosive atmosphere, it is possible to prevent the pressure sensor from being corroded.

Further, since the electrical conductors are arranged within the resin sheet of the substrate, the pressure sensor is accordingly made compact without the wire bonding that otherwise may be necessary for making electrical connection of the pressure sensor.

It is preferable that in the pressure sensor, the electrical contact pads are symmetrically disposed, on the surface of the sensor chip, with respect to the sensing area.

As a result, a thermal stress, which may occur when the pressure sensor is used in a high temperature atmosphere due to the difference in thermal expansion coefficient between the sensor chip and the electrical conductors, can be evenly applied to the surface of the sensor chip, thereby preventing the accuracy of the pressure sensor from dropping.

Moreover, in the pressure sensor, the substrate is preferably joined to the sensor chip by thermal press fitting.

It is preferable, from the view point of symmetry, that the surface of the sensor chip has a rectangular shape, and the sensing area is centrally formed on the rectangular surface of the sensor chip, and wherein at least one pair of the electrical contact pads of the sensor chip is diagonally disposed in an opposite pair of corners of the rectangular surface of the sensor chip.

It is further preferable, from the view point of symmetry, that two pairs of the electrical contact pads of the sensor chip arc disposed in four corners of the rectangular surface of the sensor chip.

Furthermore, the pressure sensor preferably further includes a plurality of electrical terminals for making electrical connection of the pressure sensor with external circuitry or devices. The electrical terminals are joined to the substrate so that the electrical terminals are electrically connected to the electrical conductors of the substrate and partially covered by the resin sheet of the substrate without any portion of the electrical terminals to be exposed to the pressure being sensed.

As a result, the electrical terminals can also be prevented from being corroded when the pressure sensor is used in a corrosive atmosphere It should be noted that the pressure sensor is especially suitable for use in sensing a pressure of an exhaust gas from an engine.

According to a second aspect of the present invention, another pressure sensor is provided which includes:

a base member;

a sensor chip supported by the base member and configured to generate an electrical signal as a function of a pressure being sensed, the sensor chip having a surface that includes a sensing area and a plurality of electrical contact pads that are disposed on the surface of the sensor chip;

a circuit chip supported by the base member, the circuit chip including a circuit that is configured to process the electrical signal generated by the sensor chip, the circuit chip also having a surface on which a plurality of electrical contact pads of the circuit chip are disposed; and a substrate including a resin sheet that has an opening formed therethrough and a plurality of electrical conductors arranged within the resin sheet, the substrate being joined to both the sensor chip and the circuit chip so that the sensing area of the surface of the sensor chip is to be exposed to the pressure being sensed through the opening of the resin sheet of the substrate, the electrical contact pads of the sensor chip and the circuit chip are electrically connected to the electrical conductors of the substrate, and all the electrical contact pads of the sensor chip and the circuit chip and the electrical conductors of the substrate are hermetically embedded in the resin sheet of the substrate.

With such a structure, when the pressure sensor is used in a corrosive atmosphere, it is possible to prevent the pressure sensor from being corroded.

Further, since the electrical conductors are arranged within the resin sheet of the substrate, the pressure sensor is accordingly made compact without the wire bonding that otherwise may be necessary for making electrical connection of the pressure sensor.

It is preferable that in the pressure sensor, at least one of the electrical conductors of the substrate is configured to function as an antenna, and the circuit chip further includes a circuit that is configured to perform a wireless communication between the pressure sensor and an external (e.g., an external circuit or device) through the antenna.

As a result, the pressure sensor can communicate with the external without electrical terminals or a large dedicated antenna which otherwise may be necessary.

It is further preferable that in the pressure sensor, the circuit chip further includes a circuit that is configured to generate electrical power when induced by the external through the antenna.

As result, the pressure sensor can be supplied with electrical power without a battery, electrical terminals, and wires which otherwise may be necessary.

Furthermore, in the pressure sensor, the antenna preferably has a loop-like shape, so that a sufficiently large area of the antenna for receiving electric wave signals is secured, thereby ensuring high sensitivity of the antenna.

It should be noted that the pressure sensor is especially suitable for use in sensing an inflation pressure of a tire of a vehicle.

Specifically, the pressure sensor is preferably to be installed on the tire or a wheel of the tire, and the circuit chip is configured to perform the wireless communication between the pressure sensor and a device that is installed in a body of the vehicle through the antenna, Accordingly, both the pressure sensors according to the first and second aspects of the present invention have a compact size and high corrosion resistance, and ensure high accuracy in sensing a pressure.

BRIEF DESCRIPTION OF THE DRAWINGS

The present invention will be understood more fully from the detailed description given hereinafter and from the accompanying drawings of the preferred embodiments of the invention, which, however, should not be taken to limit the invention to the specific embodiments but are for the purpose of explanation and understanding only.

In the accompanying drawings.

DESCRIPTION OF THE PREFERRED EMBODIMENTS

The preferred embodiments of the present invention will be described hereinafter with reference to FIGS. 1–10.

[First Embodiment]

Figure 1:
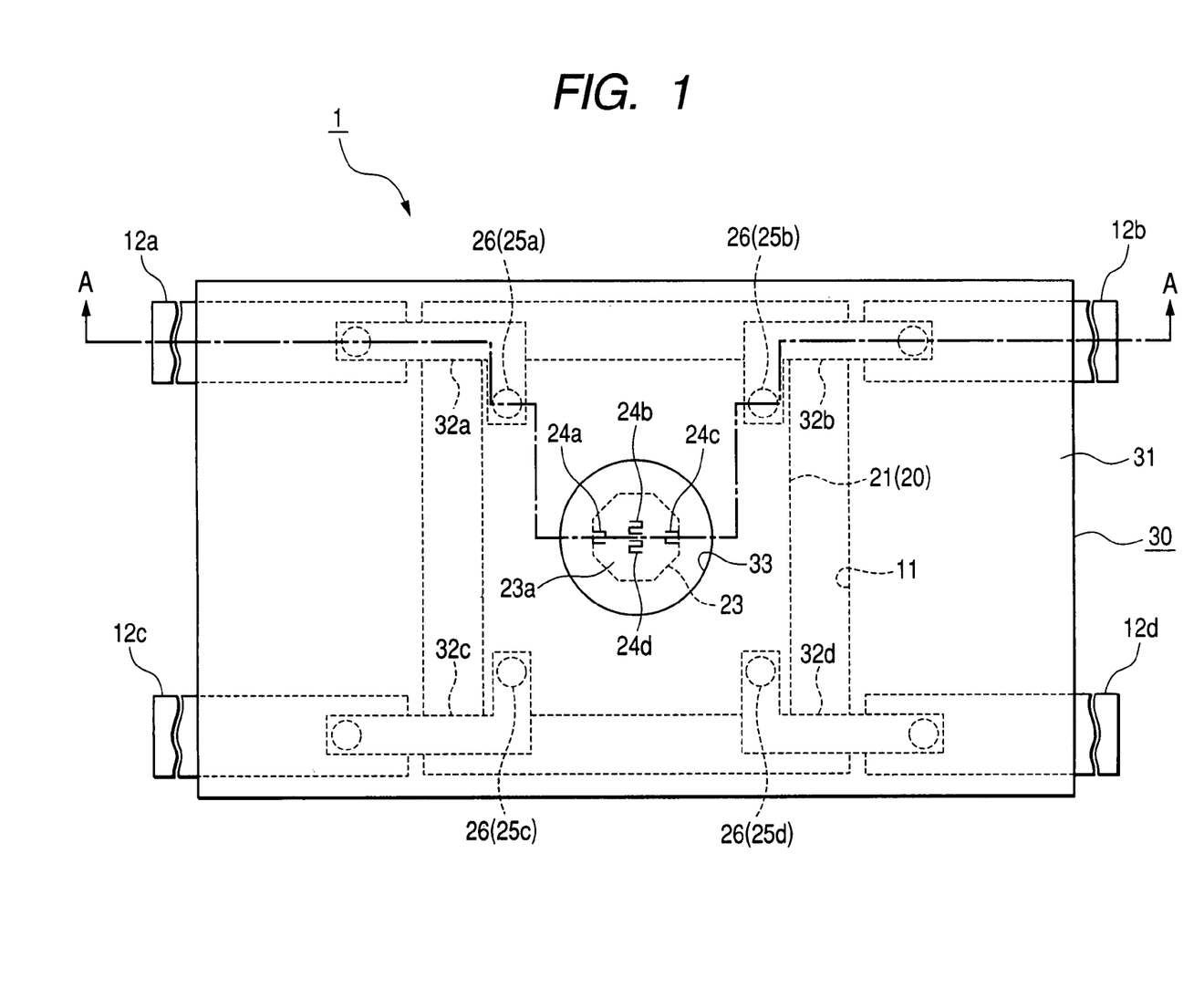
FIG. 1 is a top plan view showing a pressure sensor according to the first embodiment of the invention.
Figure 2:
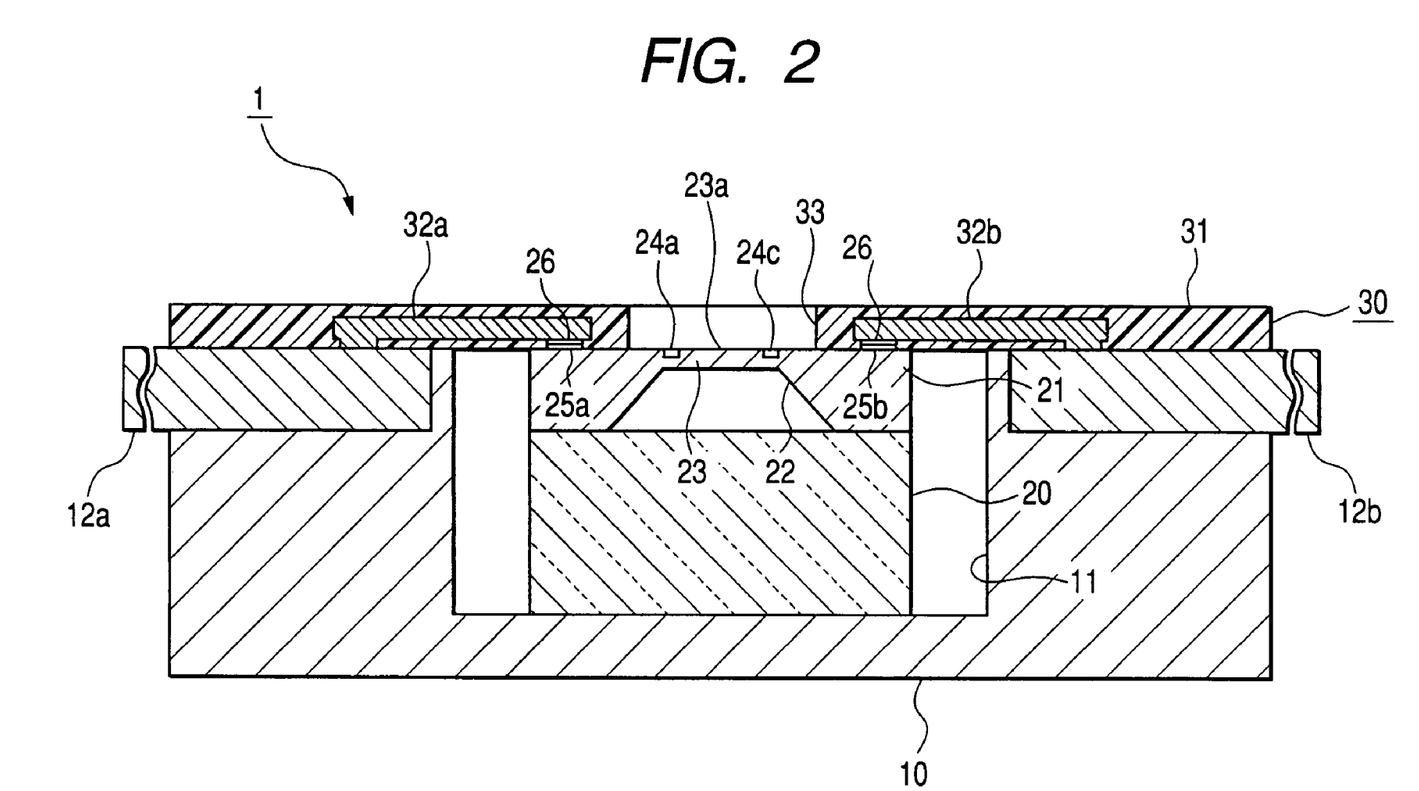
FIG. 2 is a cross-sectional side view taken along a line A—A of FIG. 1.

FIGS. 1–2 show a pressure sensor 1 according to the first embodiment of the invention.

The pressure sensor 1 is configured to sense a pressure of the exhaust gas from an engine of a vehicle. In other words, the fluid, which is to be sensed by the pressure sensor 1, is an exhaust gas.

More specifically, the pressure sensor 1 is to be used to measure a pressure on an Exhaust Gas Recirculation (EGR) path in an EGR system of the vehicle, As shown in FIGS. 1–2, the pressure sensor 1 mainly includes a base 10, a sensor chip (or sensor element) 21, and a substrate 30. The base 10 is made of a resin material and has a recess 11 formed therein which opens upwardly in FIG. 2. In the recess 11 of the base 10, the sensor chip 21 is accommodated. The substrate 30 is joined to both the sensor chip 21 and the base 10 such that it covers the upper surfaces of the sensor chip 21 and the base 10.

Figure 3A:
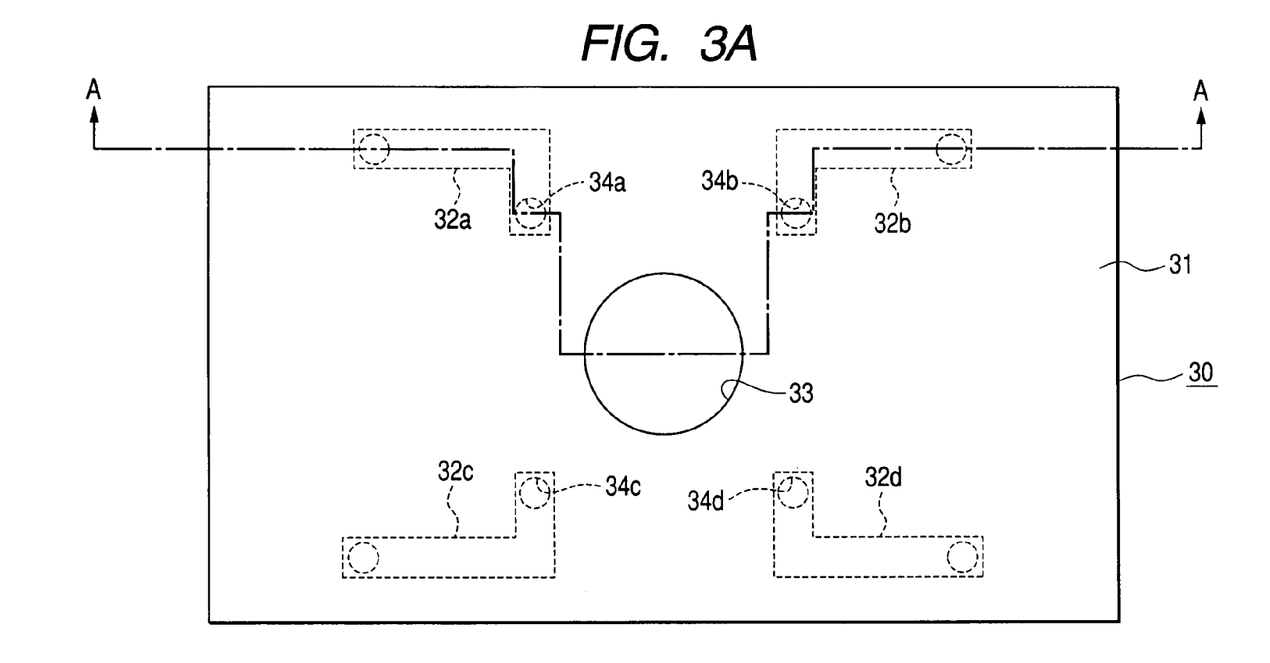
FIG. 3A is a top plan view showing a substrate of the pressure sensor of FIG. 1.
Figure 3B:
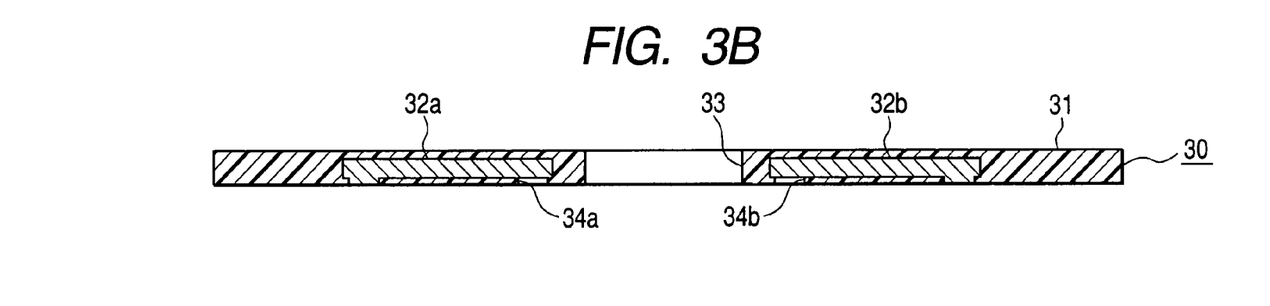
FIG. 3B is a cross-sectional side view taken along a line A—A of FIG. 3A.

The substrate 30 is shown in more detail in FIGS. 3A–3B without the base 10 and the sensor chip 21 joined thereto.

Figure 4:
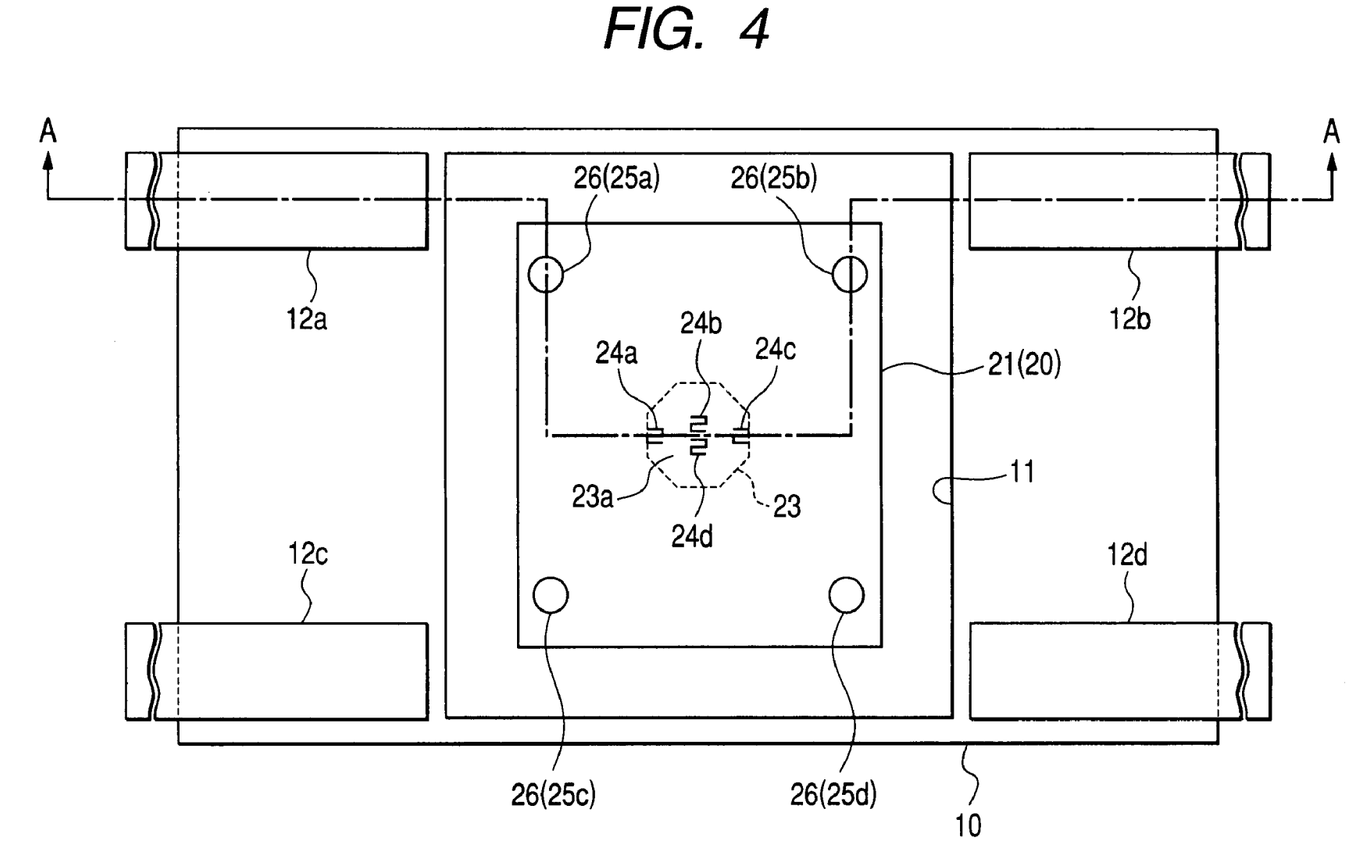
FIG. 4 is a top plan view showing all the members of the pressure sensor of FIG. 1 except for the substrate of the same.
Figure 5:
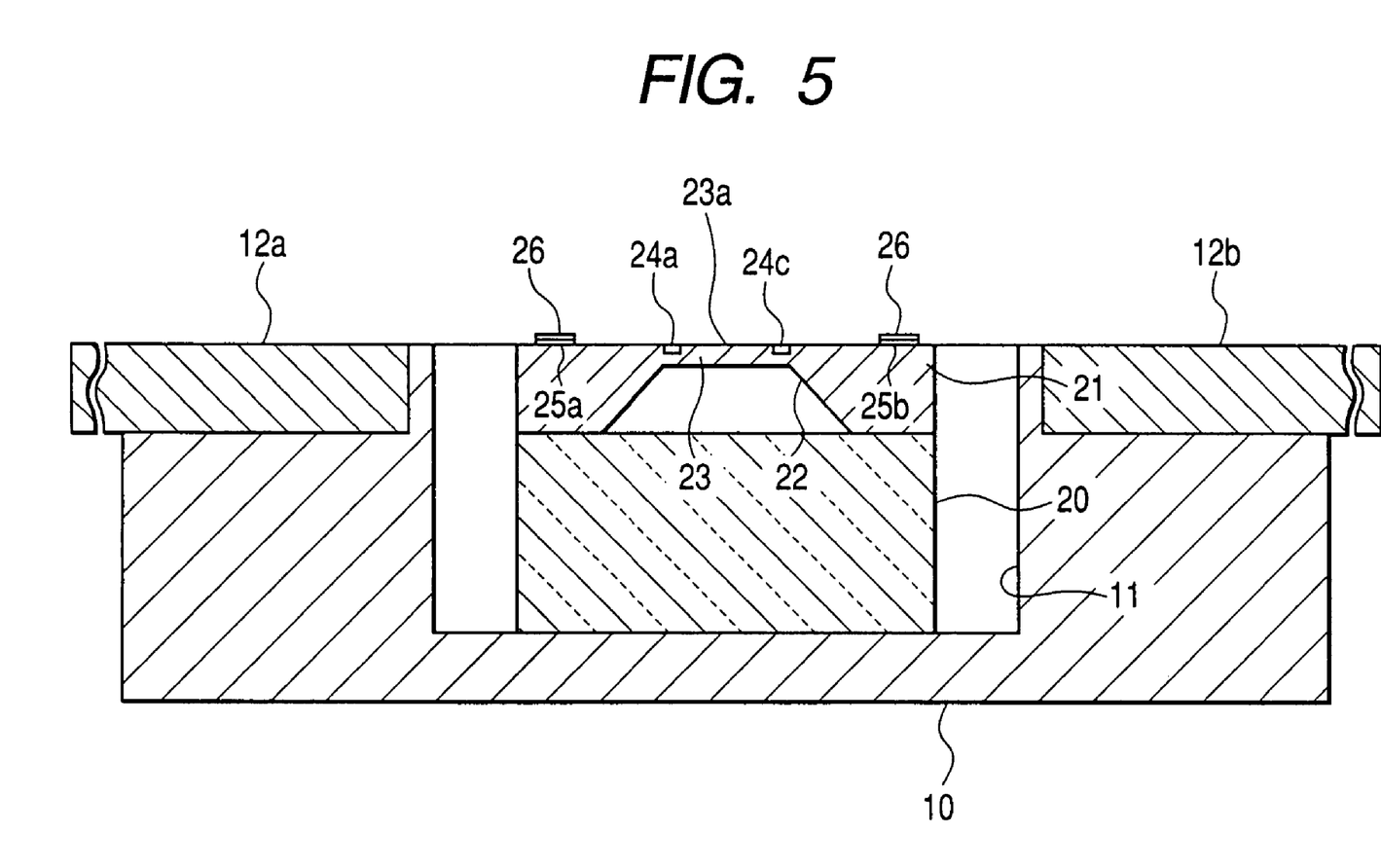
FIG. 5 is a cross-sectional side view taken along a line A—A of FIG. 4.

On the contrary, FIGS. 4–5 show the base 10 with the sensor chip 21 and a plurality of electrical terminals 12a–2d disposed therein, omitting the substrate 30.

As shown in FIGS. 4–5, in this embodiment, the base 10 has the shape of a rectangular plate, and the recess 11 is centrally formed on the rectangular upper surface of the base 10.

The sensor chip 21 is joined to an upper surface of a glass seat 20 and accommodated in the recess 11 of the base 10 together with the glass seat 20.

The sensor chip 21, which is made of a silicon material, is shaped in a rectangular plate and has a recess 22 that is centrally formed on the under surface of the sensor chip 21 and opens downwardly in FIG. 5. With the help of the recess 22, a diaphragm 23 is obtained in the sensor chip 21.

Specifically, the bottom face of the recess 22, which has an octagonal shape as indicated with a dashed line in FIG. 4, and a sensing area 23a of the upper surface of the sensor chip 21 together constitute the diaphragm 23. Since the sensor chip 21 is joined to the glass seat 20 as shown in FIG. 5, the recess 22 and the upper surface of the glass seat 20 together form a closed reference pressure (e.g., vacuum) chamber.

On the other hand, the sensing area 23a of the upper surface of the sensor chip 21 is to be exposed to a pressure being sensed. On the sensing area 23a, there are provided four gauges (or piezoresistors) 24a–24d that are impurity diffused layers formed on the surface of the sensor chip 21. More specifically, in this embodiment, the gauges 24a–24d are formed by doping a p-type dopant into an n-type silicon substrate. Further, those gauges 24a–24d together form a bridge circuit in the sensor chip 21.

When a pressure is applied to the sensing area 23a of the upper surface of the sensor chip 21, the difference in pressure between the two opposite surfaces of the diaphragm 23 (i.e., the sensing area 23a and the bottom face of the recess 22) induces a stress change in the diaphragm 23. This stress change causes the electrical resistances of the gauges 24a–24d to change due to the piezoresistive effect that those gauges 24a–24d have. Then, the bridge circuit detects the changes in the electrical resistances of the gauges 24a–24d, thereby generating an electrical signal that is representative of the pressure applied to the sensing area 23a.

The sensor chip 21 includes, as shown in FIGS. 4–5, four electrical contact pads 25a–25d that are made of an aluminum film and respectively disposed in four corners of the rectangular upper surface of the sensor chip 21. Through those electrical contact pads 25a–25d, the bridge circuit formed in the sensor chip 21 is supplied with electrical power, and the electrical signal generated by the bridge circuit is outputted to an external (e.g., an external circuit or device). On each of the electrical contact pads 25a–25d, a Nickel (Ni) film and a gold (Au) film are plated in turn, thereby forming a lamination 26 that allows making electrical connection for the electrical contact pad by soldering.

Thus, the sensor chip 21, which is accommodated in the recess 11 of the base 10, has the diaphragm 23 formed therein so as to generate the electrical signal representative of the pressure being sensed. The sensor chip 21 also has the upper surface that includes the sensing area 23a and the electrical contact pads 25a–25d that are disposed on the upper surface.

In this embodiment, the electrical contact pads 25a–25d are symmetrically arranged, on the rectangular upper surface of the sensor chip 21, with respect to the sensing area 23a. More specifically, the electrical contact pads 25a and 25d are diagonally disposed in one opposite pair of corners of the upper surface; while the electrical contact pads 25b and 25c are diagonally disposed in the other pair of corners of the same.

It should be noted that when only two electrical contact pads are used, instead of four, it is preferable that the electrical contact pads are diagonally positioned in either one pair of corners of the rectangle upper surface of the sensor chip 21, with respect to the sensing area 23a that is centrally formed on the same surface.

Further, referring to FIGS. 4–5, there are provided four electrical terminals 12a–2d, each of which is buried in the base 10 and has an exposed face in one corner of the rectangular upper surface of the base 10. More specifically, the electrical terminals 12a–2d each have the shape of a band plate and extend along the lengthwise direction of the base 10.

In addition, as shown in FIG. 5, all the exposed faces of the electrical terminals 12a–2d, the upper surface of the sensor chip 21, and the upper surface of the base 10 lie on the same plane.

Referring back to FIGS. 3A–3B, the substrate 30 also has the shape of a rectangular plate, The substrate 30 includes a resin sheet 31, which has thermal plasticity and electrical insulating properties, and a plurality of electrical conductors 32a–32d that are arranged within the resin sheet 31.

The resin sheet 31 may be made, for example, of PEEK (polyetherether ketone), PEI (polyether imide), PPS (polyphenylene sulfide), PBT (polybutylene terephthalate), PET (polyethylene terephthalate), PEN (polyethylene naphthalate), and LCP (liquid crystal polymer), or a mixture thereof. On the other hand, the electrical conductors 32a–32d may be made, for example, of Cu.

The resin sheet 31 has, as shown in FIGS. 3A–3B, a circular opening 33 that is centrally formed through the resin sheet 31. The opening 33 is provided for allowing, when the resin sheet 31 is joined to the sensor chip 21 as shown in FIGS. 1–2, the sensing area 23a of the sensor chip 21 to be exposed to the pressure being sensed. Around the opening 31, the electrical conductors 32a–32d are symmetrically disposed.

The resin sheet 31 further has a plurality of via holes 34a–34d, each of which is formed in the resin sheet 31 at the inner end (i.e., the end close to the opening 33) of one of the electrical conductors 32a–32d. Through the via holes 34a–34d, all the inner ends of the electrical conductors 32a–32d are exposed. Similarly, the outer ends of the electrical conductors 32a–32d are also exposed through via holes that are formed in the resin sheet 31 in the same way as the via holes 34a–34d.

Thus, the substrate 30 is configured to have the electrical conductors 32a–32d arranged within the resin sheet 31. The substrate 30 is joined to all the upper surfaces of the sensor chip 21, the base 10, and the electrical terminals 12a–2d by thermal press fitting, thereby forming the pressure sensor 1 according to the present embodiment.

At the same time, the electrical conductors 32a–32d of the substrate 30 are joined to, referring again to FIGS. 1–2, the electrical contact pads 25a–25d of the sensor chip 21 and the electrical terminals 12a–2d by soldering.

Specifically, solder paste was first applied to all the inner and outer ends of the electrical conductors 32a–32d of the substrate 30 through the via holes formed in the resin sheet 31. Then, the substrate 30 was placed on the upper surfaces of the sensor chip 21, the base 10, and the electrical terminals 12a–2d, and joined thereto by thermal press fitting.

During the thermal press fitting, the solder paste was melted by the heat transferred thereto, thereby joining the inner ends of the electrical conductors 32a–32d of the substrate 30 to the electrical contact pads 25a–25d of the sensor chip 21 and the outer ends of the same to the electrical terminals 12a–2d respectively. As a result, all the joining portions between the electrical conductors 32a–32d and the electrical contact pads 25a–25d and between the electrical conductors 32a–32d and the electrical terminals 12a–2d are hermetically buried in the resin sheet 31, while the sensing area 23a of the upper surface of the sensor chip 21 is exposed through the opening 33 of the resin sheet 31.

In other words, except for the sensing area 23a, both the upper surfaces of the sensor chip 21 and the base 10 are completely covered by the substrate 30. Further, the upper surfaces of the electrical terminals 12a–2d are partially covered by the substrate 30, without any area thereof to be exposed to the pressure being sensed.

It should be noted that, those portions of the electrical terminals 12a–2d, which protrude from the base 10 as shown in FIGS. 1–2, are for use in making electrical connection of the pressure sensor 1 with an external; those portions are not to be exposed to the pressure being sensed.

To sum up, in the pressure sensor 1 according to the present embodiment, the substrate 30 is joined to the sensor chip 21 so that the sensing area 23a of the sensor chip 21 is to be exposed to the pressure being sensed through the opening 33 of the resin sheet 31 of the substrate 30, the electrical contact pads 25a–25d of the sensor chip 21 are electrically connected to the electrical conductors 32a–32d of the substrate 30, and all the electrical contact pads of the sensor chip 21 and the electrical conductors of the substrate 30 are hermetically embedded in the resin sheet 31 of the substrate 30.

With such a structure, when the pressure sensor 1 is used in a corrosive atmosphere, it is possible to prevent the pressure sensor 1 from being corroded.

Further, since the electrical conductors 32a–32d are arranged within the resin sheet 31 of the substrate 30, the pressure sensor 1 is accordingly made compact without the wire bonding that otherwise may be necessary for making electrical connection of the pressure sensor 1.

Furthermore, the electrical contact pads 25a–25d of the sensor chip 21 are symmetrically arranged, on the upper surface of the sensor chip 21, with respect to the sensing area 23a of the upper surface, thus ensuring high accuracy of the pressure sensor 1.

More specifically, the sensor chip 21 made of a silicon material and the electrical conductors 32a–32d of the substrate 30 which are made of Cu have different thermal expansion coefficients. Therefore, a thermal stress may be applied to the sensor chip 21 due to the difference in thermal expansion coefficient between the sensor chip 21 and the electrical conductors 32a–32d, thus causing the diaphragm 23 of the sensor chip 21 to be deformed.

However, with the symmetrical arrangement of the electrical contact pads 25 according to the present embodiment, the thermal stress can be evenly applied to the upper surface of the sensor chip 21, thereby preventing the diaphragm 23 of the sensor chip 21 from being unevenly deformed. As a result, the accuracy of the pressure sensor 1 can be prevented from dropping even when the pressure sensor 1 is used in a high temperature atmosphere.

Accordingly, the pressure sensor 1 according to the present embodiment has a compact size and high corrosion resistance and ensures high accuracy in sensing a pressure. The pressure sensor 1 is especially suitable for use in sensing a pressure of the exhaust gas from an engine.

[Second Embodiment]

Figure 6:
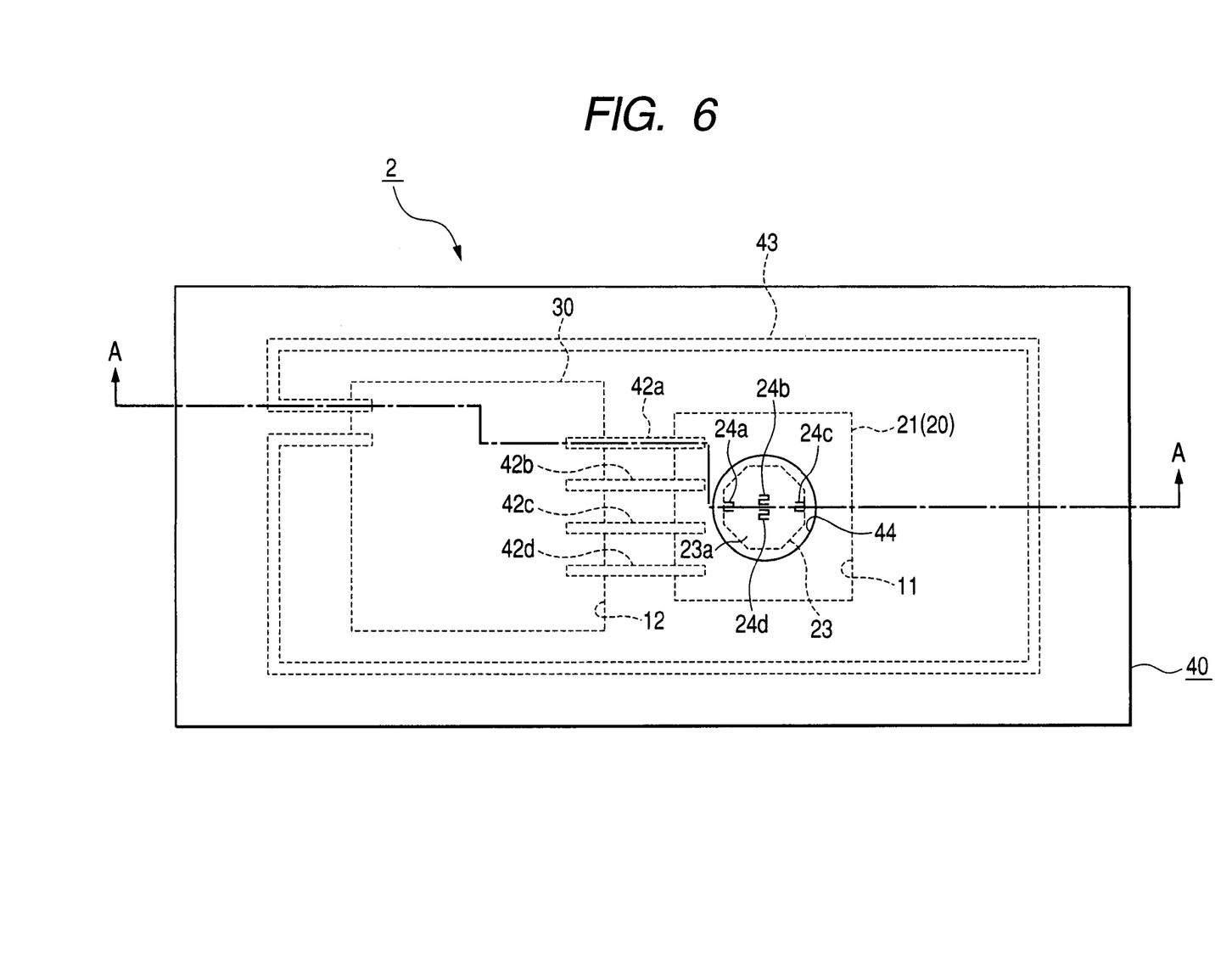
FIG. 6 is a top plan view showing a pressure sensor according to the second embodiment of the invention.
Figure 7:
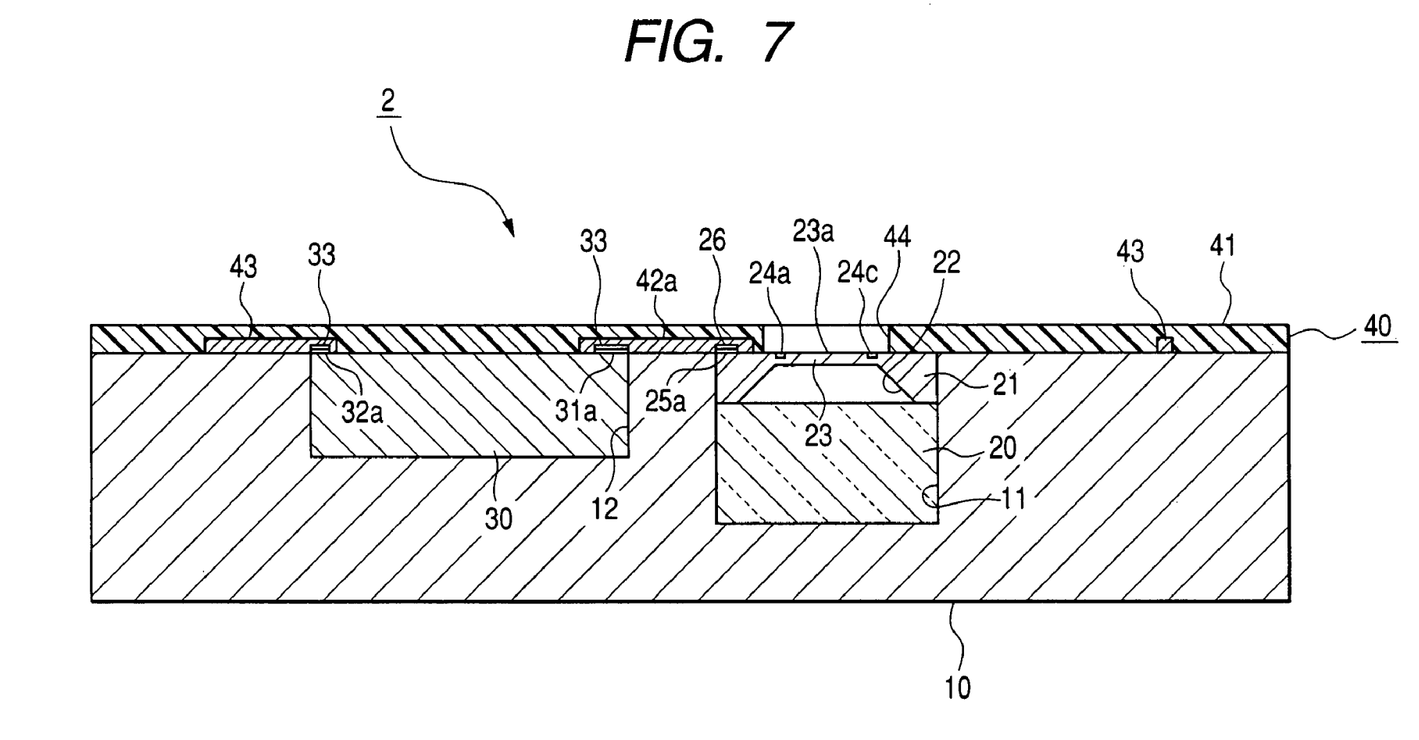
FIG. 7 is a cross-sectional side view taken along a line A—A of FIG. 6.

FIGS. 6–7 show a pressure sensor 2 according to the second embodiment of the invention.

The pressure sensor 2 is configured to be used in a tire inflation pressure monitoring system of a vehicle. More specifically, the pressure sensor 2 is to be installed on a tire (or the wheel of a tire) of the vehicle, directly sense the inflation pressure of the tire, and transmit information about the sensed inflation press of the tire to a control device (not shown) installed in the body of the vehicle by wireless communication. When the sensed inflation pressure of the tire becomes lower than a predetermined value, the control device is to give an alarm to the driver of the vehicle.

As shown in FIGS. 6–7, the pressure sensor 2 mainly includes a base 10, a sensor chip (or sensor element) 21, a circuit chip 30, and a substrate 40. The base 10 is made of a resin material and has two recesses 11 and 12 formed therein, both of which open upwardly in FIG. 7. The sensor chip 21 and the circuit chip 30 are respectively accommodated in the recesses 11 and 12 of the base 10. The substrate 40 is joined to the base 10, the sensor chip 21 and the circuit chip 30, so that it covers the upper surfaces of the base 10 and the two chips 21 and 30.

Figure 8A:
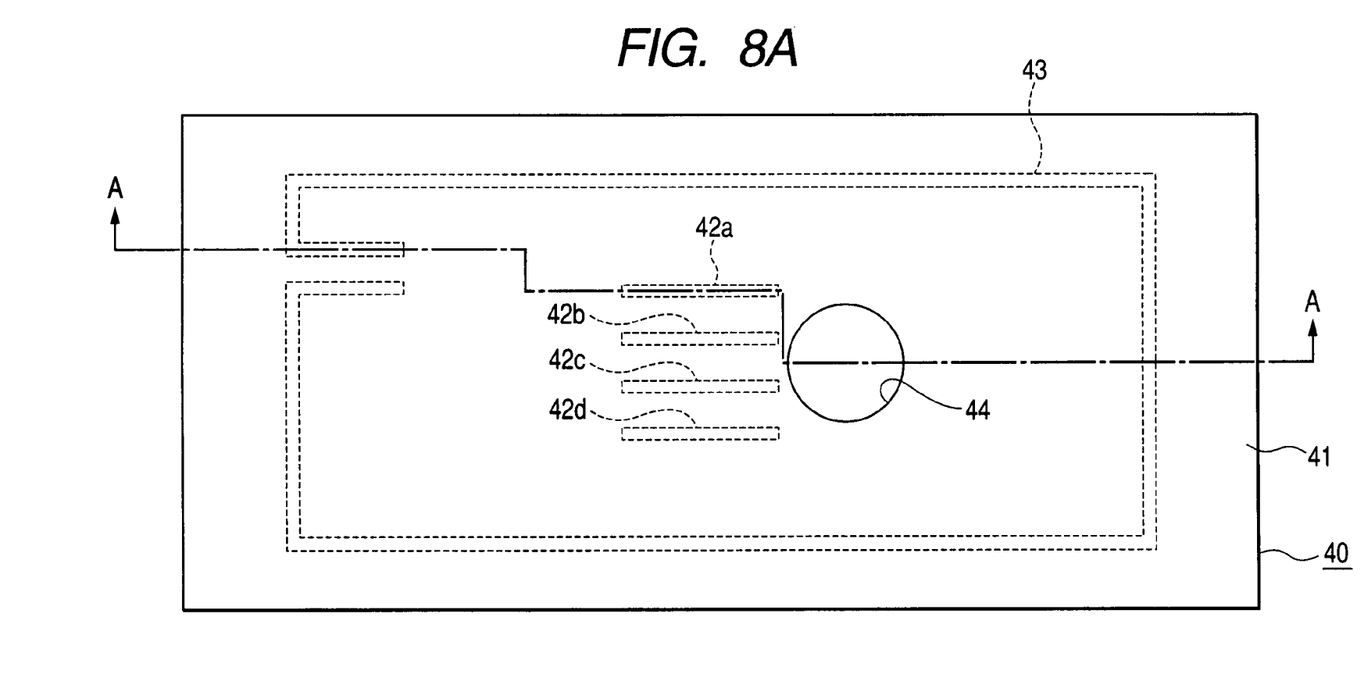
FIG. 8A is a top plan view showing a substrate of the pressure sensor of FIG. 6.
Figure 8B:
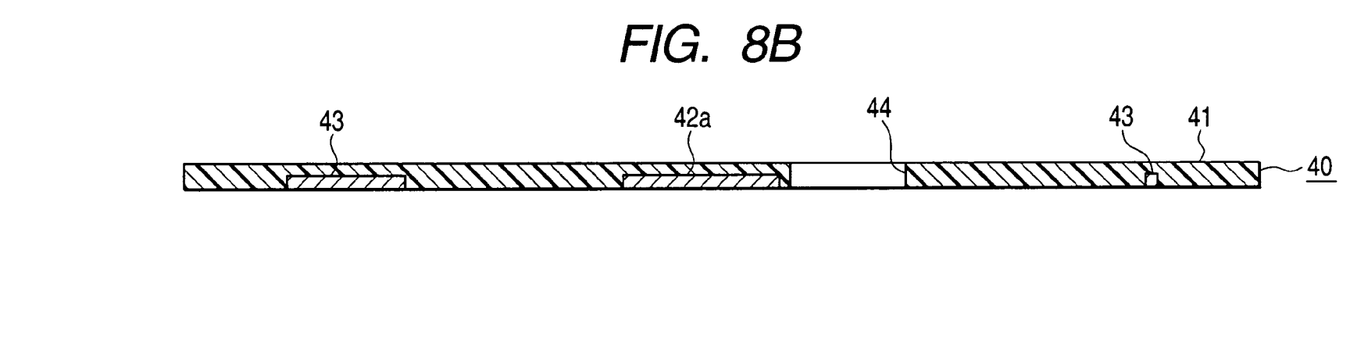
FIG. 8B is a cross-sectional side view taken along a line A—A of FIG. 8A.

The substrate 40 is shown in more detail in FIGS. 8A–8B without the base 10 and the two chips 21 and 30 joined thereto.

Figure 9:
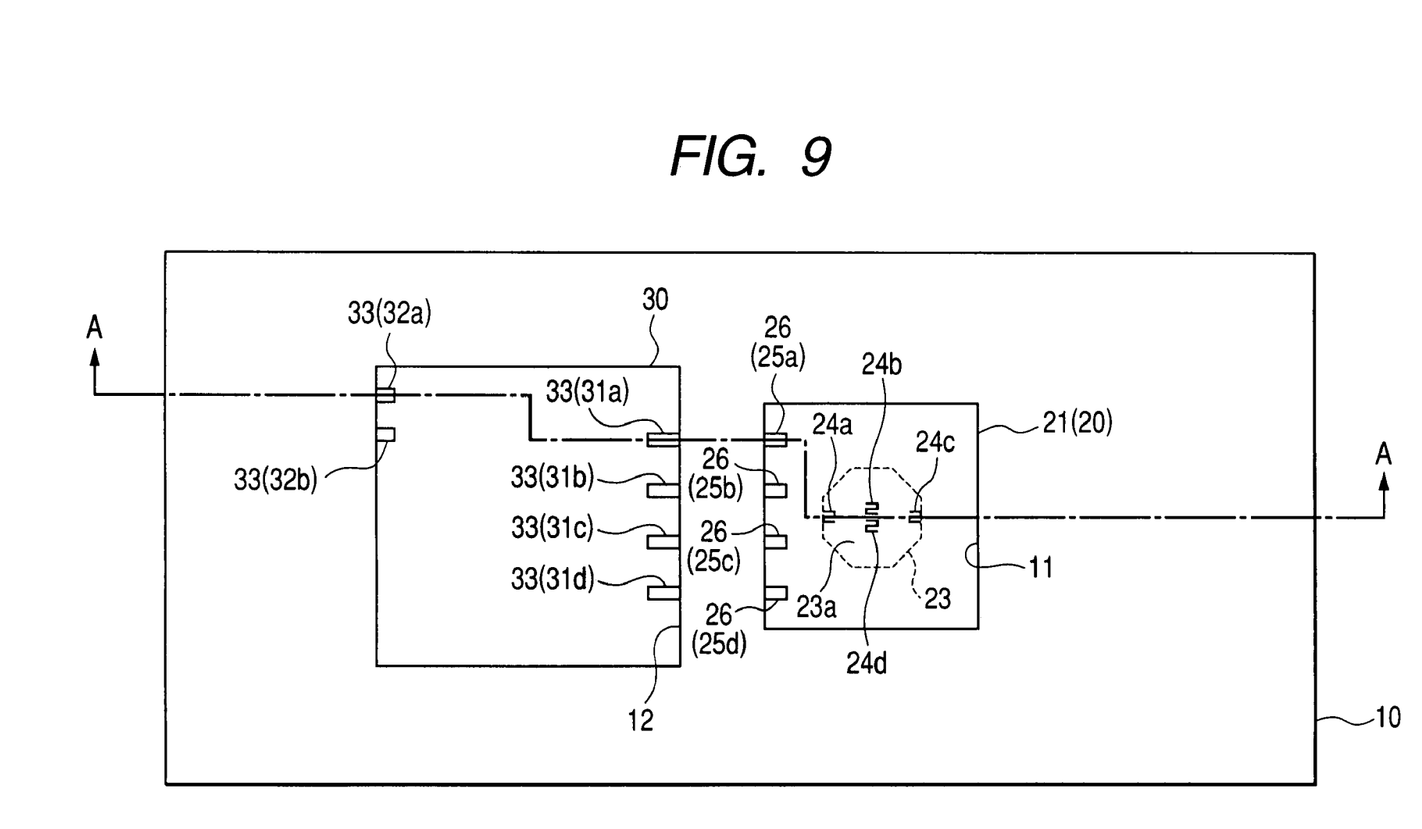
FIG. 9 is a top plan view showing all the members of the pressure sensor of FIG. 6 except for the substrate of the same.
Figure 10:
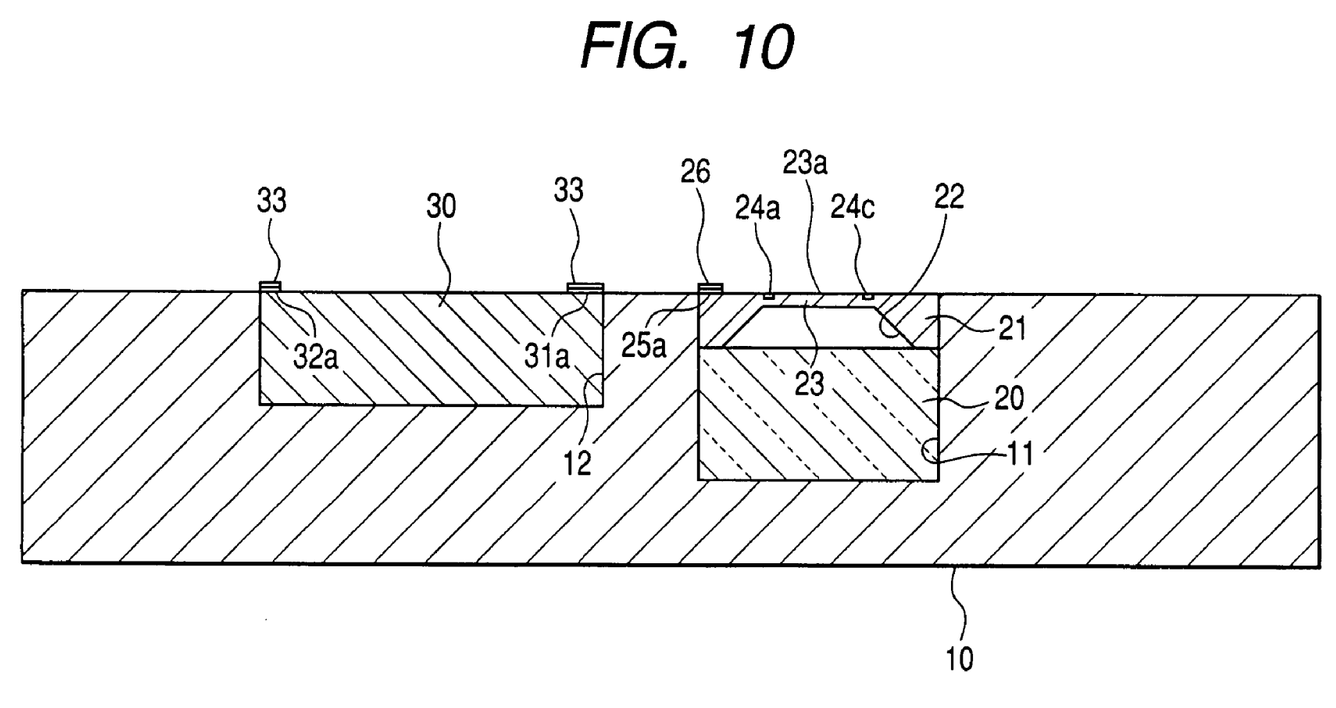
FIG. 10 is a cross-sectional side view taken along a line A—A of FIG. 9.

On the contrary, FIGS. 9–10 show the base 10 with the sensor chip 21 and the circuit chip 30 disposed therein, omitting the substrate 40.

As shown in FIGS. 9–10, in this embodiment, the base 10 has the shape of a rectangular plate, and the recesses 11 and 12 are formed in a central area of the rectangular upper surface of the base 10.

The sensor chip 21 is joined to an upper surface of a glass seat 20 and accommodated in the recess 11 of the base 10 together with the glass seat 20.

The sensor chip 21, which is made of a silicon material, has the shape of a rectangular plate and a recess 22 that is centrally formed on the under surface of the sensor chip 21 and opens downwardly in FIG. 10. With the help of the recess 22, a diaphragm 23 is obtained in the sensor chip 21.

Specifically, the bottom face of the recess 22, which has an octagonal shape as indicated with a dashed line in FIG. 9, and a sensing area 23a of the upper surface of the sensor chip 21 together constitute the diaphragm 23. Since the sensor chip 21 is joined to the glass seat 20 as shown in FIG. 10, the recess 22 and the upper surface of the glass seat 20 together form a closed reference pressure (e.g., vacuum) chamber.

On the other hand, the sensing area 23a of the upper surface of the sensor chip 21 is to be exposed to a pressure being sensed. On the sensing area 23a, there are provided four gauges (or piezoresistors) 24a–24d that are impurity diffused layers formed on the surface of the sensor chip 21. More specifically, in this embodiment, the gauges 24a–24d are formed by doping a p-type dopant into an n-type silicon substrate. Further, those gauges 24a–24d together form a bridge circuit in the sensor chip 21.

When a pressure is applied to the sensing area 23a of the upper surface of the sensor chip 21, the difference in pressure between the two opposite surfaces of the diaphragm 23 (i.e., the sensing area 23a and the bottom face of the recess 22) induces a stress change in the diaphragm 23. This stress change causes the electrical resistances of the gauges 24a–24d to change due to the piezoresistive effect that those gauges 24a–24d have. Then, the bridge circuit detects the changes in the electrical resistances of the gauges 24a–24d, thereby generating an electrical signal that is representative of the pressure applied to the sensing area 23a.

The sensor chip 21 includes, as shown in FIGS. 9–10, four electrical contact pads 25a–25d that are made of an aluminum film and disposed along the left side of the rectangular upper surface of the sensor chip 21. Through those electrical contact pads 25a–25d, the bridge circuit formed in the sensor chip 21 is supplied with electrical power, and the electrical signal generated by the bridge circuit is outputted to an external (e.g., an external circuit or device). On each of the electrical contact pads 25a–25d, a Ni film and a Au film are plated in turn, thereby forming a lamination 26 that allows making electrical connection for the electrical contact pad by soldering.

Thus, the sensor chip 21, which is accommodated in the recess 11 of the base 10, has the diaphragm 23 formed therein so as to generate the electrical signal representative of the pressure being sensed. The sensor chip 21 also has the upper surface that includes the sensing area 23a and the electrical contact pads 25a–25d that are disposed on the upper surface.

On the other hand, the circuit chip 30 includes various devices by which at least three different electrical circuits are provided in the circuit chip 30. Specifically, they are the first circuit for processing (e.g. amplifying) the electrical signal from the sensor chip 21, the second circuit for performing a wireless communication between the pressure sensor 2 and an external (i.e., the control device installed in the body of the vehicle) by means of an antenna to be described below, and the third circuit for generating electric power when induced by the external through the antenna.

It should be noted that although the three electrical circuits are integrated into a single circuit chip in this embodiment, they may also be respectively provided in three different circuit chips and then electrically connected with each other.

As shown in FIGS. 9–10, the circuit chip 30 has the shape of a rectangular plate and includes four electrical contact pads 31a–3d that are made of an aluminum film and disposed along the right side of the rectangular upper surface of the circuit chip 30. The circuit chip 30 further includes two electrical contact pads 32a–32b that are also made of an aluminum film and disposed along the left side of the upper surface of the circuit chip 30 near the upper-left corner of the same. On each of the electrical contact pads 31a–31d and 32a–32b, a Ni film and a Au film are plated in turn, thereby forming a lamination 33 that allows making electrical connection for the electrical contact pad by soldering.

Thus, the circuit chip 30, which is accommodated in the recess 12 of the base 10, has the three electrical circuits and has the upper surface on which the electrical contact pads 31a–31d and 32a–32b are disposed. Through the electrical contact pads 31a–31d, the circuit chip 30 supplies electrical power to the sensor chip 21 and receives the electrical signal representative of the sensed pressure from the sensor chip 21. Through the electrical contact pads 32a–32b, the circuit chip 30 is electrically connected with the antenna so as to communicate with the external.

In addition, as shown in FIG. 10, all the upper surfaces of the sensor chip 21, the circuit chip 30, and the base 10 lie on the same plane.

Referring back to FIGS. 8A–8B, the substrate 40 also has the shape of a rectangular plate. The substrate 40 includes a resin sheet 41, which has thermal plasticity and electrical insulating properties, and a plurality of electrical conductors 42a–42d and 43 that are arranged within the resin sheet 31.

The resin sheet 41 may be made, for example, of PEEK, PEI, PPS, PST, PET, PEN, LCP, or a mixture thereof. On the other hand, the electrical conductors 42a–42d and 43 may be made, for example, of Cu.

The resin sheet 41 has, as shown in FIGS. 8A–8B, a circular opening 44 that is provided for allowing, when the resin sheet 41 is joined to the sensor chip 21 as shown in FIGS. 6–7, the sensing area 23a of the sensor chip 21 to be exposed to the pressure being sensed.

The electrical conductors 42a–42d are arranged in parallel with each other in a central area of the resin sheet 41, and used to electrically connect the sensor chip 21 with the circuit chip 30. The electrical conductor 43 has a loop-like shape and constitutes the antenna through which the wireless communication between the pressure sensor 2 and the external is performed and the circuit chip 30 is induced by the external to generate electrical power. Additionally, all the electrical conductors 42a–42d and 43 are exposed on the under surface of the resin sheet 41.

Thus, the substrate 40 is configured to have the resin sheet 41 in which electrical conductors 42a–42d and the antenna 43 are arranged. The substrate 40 is joined to all the upper surfaces of the sensor chip 21, the circuit chip 30, and the base 10 by thermal press fitting, thereby forming the pressure sensor 2 according to the present embodiment.

At the same time, the electrical conductors 42a–42d and the antenna 43 of the substrate 40 are joined to, referring again to FIGS. 6–7, the electrical contact pads 25a–25d of the sensor chip 21 and the electrical contact pads 31a–31d and 32a–32b of the circuit chip 30 by soldering.

Specifically, solder paste was first applied to both ends of each of the electrical conductors 42a–42d and the antenna 43 which are exposed on the under surface of the resin sheet. Then, the substrate 40 was placed on the upper surfaces of the sensor chip 21, the circuit chip 30, and the base 10, and joined thereto by thermal press fitting.

During the thermal press fitting, the solder paste was melted by the heat transferred thereto, thereby joining the electrical conductors 42a–42d of the substrate 40 to the electrical contact pads 25a–25d of the sensor chip 21 and the electrical contact pads 31a–31d of the circuit chip 30 and joining the antenna 43 to the electrical contact pads 32a–32b, respectively. As a result, all the joining portions between the electrical conductors 42a–42d and the electrical contact pads 25a–25d, 31a–31d and between the antenna 43 and the electrical contact pads 32a–32b are hermetically buried in the resin sheet 41, while the sensing area 23a of the sensor chip 21 is exposed through the opening 44 of the resin sheet 41.

In other words, except for the sensing area 23a, all the upper surfaces of the sensor chip 21, the circuit chip 30, and the base 10 are completely covered by the substrate 30.

To sum up, in the pressure sensor 2 according to the present embodiment, the substrate 40 is joined to both the sensor chip 21 and the circuit chip 30 so that the sensing area 23a of the sensor chip 21 is to be exposed to the pressure being sensed through the opening 44 of the resin sheet 41 of the substrate 40, the electrical contact pads 25a–25d of the sensor chip 21 and the electrical contact pads 31a–31d, 32a–32b of the circuit chip 30 are electrically connected to the electrical conductors 42a–42d and 43 of the substrate 40, and all the electrical contact pads of the sensor chip 21 and the circuit chip 30 and the electrical conductors of the substrate 40 are hermetically embedded in the resin sheet 41 of the substrate 40.

With such a structure, when the pressure sensor 2 is used in a corrosive atmosphere, it is possible to prevent the pressure sensor 2 from being corroded.

Further, since the electrical conductors 42a–42d and the antenna 43 are arranged in the resin sheet 41 of the substrate 40, the pressure sensor 2 is accordingly made compact without the wire bonding, which otherwise may be necessary for making electrical connection of the pressure sensor 2, and a large dedicated antenna.

Furthermore, the circuit chip 30 includes the first circuit for processing the electrical signal from the sensor chip 21, the second circuit for performing the wireless communication between the pressure sensor 2 and the external (i.e., the control device in the body of the vehicle) by means of the antenna 43, and the third circuit for generating electric power when induced by the external through the antenna 43.

Consequently, the pressure sensor 2 can wirelessly communicate with the external and be supplied with electric power, without any additional electrical terminals and battery that otherwise may be necessary for transmission of electrical signals and electric power supply.

Moreover, the antenna 43 has the loop-like shape, so that a sufficiently large area of the antenna 43 for receiving electric wave signals is secured, thereby ensuring high sensitivity of the antenna 43.

In addition, it should be noted that the circuit chip 30 of the pressure sensor 2 further includes a temperature compensation circuit so as to compensate sensing errors of the pressure sensor 2 which are caused due to ambient temperature changes.

Accordingly, the pressure sensor 2 according to the present embodiment has a compact size and high corrosion resistance and ensures high accuracy in sensing a pressure. The pressure sensor 2 is especially suitable for use in the tire inflation pressure monitoring system of a vehicle.

[Other Embodiments]

While the above particular embodiments of the invention have been shown and described, it will be understood by those who practice the invention and those skilled in the art that various modifications, changes, and improvements may be made to the invention without departing from the spirit of the disclosed concept.

For example, in the first embodiment of the invention, the pressure sensor 1 is configured to sense a pressure of the exhaust gas from an engine.

However, the pressure sensor 1 may also be configured to sense any other pressures, such as the inflation pressure of a tire as in the second embodiment of the invention.

Moreover, in the second embodiment of the invention, the circuit chip 30 of the pressure sensor 2 includes the three electrical circuits.

However, the circuit chip 30 may also be configured to include only the first circuit for processing the electrical signal from the sensor chip 21 and the second circuit for performing the wireless communication between the pressure sensor 2 and the external by means of the antenna 43, without the third circuit for generating electric power. Even so, the pressure sensor 2 is still more compact than the existing pressure sensor described previously.

Such modifications, changes, and improvements within the skill of the art are intended to be covered by the appended claims.

What is claimed is:

1. A pressure sensor comprising:
   a sensor chip configured to generate an electrical signal as a function of a pressure being sensed, said sensor chip having a surface that includes a sensing area and a plurality of electrical contact pads that are disposed on the surface of said sensor chip; and
   a substrate including a resin sheet that has an opening formed therethrough and a plurality of electrical conductors arranged within the resin sheet, said substrate being joined to said sensor chip so that the sensing area of the surface of said sensor chip is to be exposed to the pressure being sensed through the opening of the resin sheet of said substrate, the electrical contact pads of said sensor chip are electrically connected to the electrical conductors of said substrate, and all the electrical contact pads and electrical conductors are hermetically embedded in the resin sheet of said substrate.

2. A pressure sensor comprising:
   a sensor chip configured to generate an electrical signal as a function of a pressure being sensed, said sensor chip having a surface that includes a sensing area and a plurality of electrical contact pads that are disposed symmetrically, on the surface of said sensor chip, with respect to the sensing area; and
   a substrate including a resin sheet that has an opening formed therethrough and a plurality of electrical conductors arranged within the resin sheet, said substrate being joined to said sensor chip so that the sensing area of the surface of said sensor chip is to be exposed to the pressure being sensed through the opening of the resin sheet of said substrate, the electrical contact pads of said sensor chip are electrically connected to the electrical conductors of said substrate, and all the electrical contact pads and electrical conductors are hermetically embedded in the resin sheet of said substrate.

3. The pressure sensor as set forth in claim 2, wherein said substrate is joined to said sensor chip by thermal press fitting.

4. The pressure sensor as set forth in claim 2, wherein the surface of said sensor chip has a rectangular shape, and the sensing area is centrally formed on the rectangular surface of said sensor chip, and wherein at least one pair of the electrical contact pads of said sensor chip is diagonally disposed in an opposite pair of corners of the rectangular surface of said sensor chip.

5. The pressure sensor as set forth in claim 4, wherein two pairs of the electrical contact pads of said sensor chip are disposed in four corners of the rectangular surface of said sensor chip.

6. The pressure sensor as set forth in claim 2, further comprising a plurality of electrical terminals for making electrical connection of the pressure sensor with external circuitry, said electrical terminals being joined to said substrate so that said electrical terminals are electrically connected to the electrical conductors of said substrate and partially covered by the resin sheet of said substrate without any portion of said electrical terminals to be exposed to the pressure being sensed.

7. The pressure sensor as set forth in claim 6, wherein said electrical terminals are joined to said substrate by thermal press fitting.

8. The pressure sensor as set forth in claim 2, wherein the pressure being sensed is a pressure of an exhaust gas from an engine.

9. A pressure sensor comprising:
   a base member;
   a sensor chip supported by said base member and configured to generate an electrical signal as a function of a pressure being sensed, said sensor chip having a surface that includes a sensing area and a plurality of electrical contact pads that are disposed on the surface of said sensor chip;
   a circuit chip supported by said base member, said circuit chip including a circuit that is configured to process the electrical signal generated by said sensor chip, said circuit chip also having a surface on which a plurality of electrical contact pads of said circuit chip are disposed; and
   a substrate including a resin sheet that has an opening formed therethrough and a plurality of electrical conductors arranged within the resin sheet, said substrate being joined to both said sensor chip and said circuit chip so that the sensing area of the surface of said sensor chip is to be exposed to the pressure being sensed through the opening of the resin sheet of said substrate, the electrical contact pads of said sensor chip and said circuit chip are electrically connected to the electrical conductors of said substrate, and all the electrical contact pads of said sensor chip and said circuit chip and the electrical conductors of said substrate are hermetically embedded in the resin sheet of said substrate.

10. The pressure sensor as set forth in claim 9, wherein said substrate is joined to both said sensor chip and said circuit chip by thermal press fitting.

11. The pressure sensor as set forth in claim 9, wherein at least one of the electrical conductors of said substrate is configured to function as an antenna, and said circuit chip further includes a circuit that is configured to perform a wireless communication between the pressure sensor and an external through the antenna.

12. The pressure sensor as set forth in claim 11, wherein said circuit chip further includes a circuit that is configured to generate electrical power when induced by the external through the antenna.

13. The pressure sensor as set forth in claim 11, wherein the antenna has a loop-like shape.

14. The pressure sensor as set forth in claim 11, wherein the pressure being sensed is an inflation pressure of a tire of a vehicle.

15. The pressure sensor as set forth in claim 14, wherein the pressure sensor is configured to be installed on the tire or a wheel of the tire, and the circuit chip is configured to perform the wireless communication between the pressure sensor and a device that is installed in a body of the vehicle through the antenna.

16. The pressure sensor as set forth in claim 9, wherein at least one of the electrical conductors of said substrate is configured to function as an antenna, and said circuit chip further includes a circuit that is configured to generate electrical power when induced by an external through the antenna.

17. The pressure sensor as set forth in claim 16, wherein the antenna has a loop-like shape.

18. The pressure sensor as set forth in claim 16, wherein the pressure being sensed is an inflation pressure of a tire of a vehicle.

19. The pressure sensor as set forth in claim 18, wherein the pressure sensor is configured to be installed on the tire or a wheel of the tire, and the circuit chip is configured to generate electrical power when induced by a device that is installed in a body of the vehicle through the antenna.

20. The pressure sensor as set forth in claim 9, wherein the pressure being sensed is an inflation pressure of a tire of a vehicle.

* * * * *